(12) United States Patent
Nishiyama

(10) Patent No.: US 8,126,933 B2
(45) Date of Patent: Feb. 28, 2012

(54) OPERATIONAL ASSISTANCE SERVER DEVICE, OPERATIONAL ASSISTANCE METHOD AND COMPUTER PROGRAM

(75) Inventor: Risa Nishiyama, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 366 days.

(21) Appl. No.: 12/394,742

(22) Filed: Feb. 27, 2009

(65) Prior Publication Data

US 2009/0228479 A1 Sep. 10, 2009

(30) Foreign Application Priority Data

Feb. 28, 2008 (JP) .................................. 2008-48343

(51) Int. Cl.
*G06F 7/00* (2006.01)
*G06F 17/00* (2006.01)
*G06F 17/30* (2006.01)
(52) U.S. Cl. ........................................ 707/803; 707/694
(58) Field of Classification Search .................. 707/803, 707/694
See application file for complete search history.

(56) References Cited

U.S. PATENT DOCUMENTS

| | | | | |
|---|---|---|---|---|
| 5,581,684 A * | 12/1996 | Dudzik et al. | ................ | 715/708 |
| 6,212,494 B1 * | 4/2001 | Boguraev | ...................... | 707/102 |
| 7,340,046 B2 * | 3/2008 | McClung et al. | ............. | 715/753 |
| 7,809,772 B2 * | 10/2010 | Harada et al. | ................. | 707/803 |
| 2002/0054094 A1 * | 5/2002 | Matsuda | ....................... | 345/753 |
| 2004/0162890 A1 * | 8/2004 | Ohta | ............................ | 709/218 |

* cited by examiner

FOREIGN PATENT DOCUMENTS

JP 2005056022 A2 3/2005

*Primary Examiner* — Greta Robinson
*Assistant Examiner* — Brian E Weinrich
(74) *Attorney, Agent, or Firm* — Vazken Alexanian

(57) ABSTRACT

An operational assistance server device, method and computer readable article of manufacture for providing operational assistance to a user operating an application is provided. The operational assistance server device includes: an operation table; an operation table storage unit for storing the operation table; an user's operation history; an operation sequence generation unit for generating the operation sequence; an operation record storage unit; operation subsequences; an appearing-operation-sequence extraction unit for extracting appearing operation sequences from the operation subsequences; and an appearing-operation-sequence storage unit for storing the appearing operation sequences extracted by the appearing-operation-sequence extraction unit; where the appearing operation sequence appears at a frequency higher than a predetermined value. The method and computer readable article of manufacture storing the method includes the steps of: generating the operation sequence; storing the generated operation sequences; extracting the appearing operation sequences; and storing the extracted appearing operation sequences.

17 Claims, 14 Drawing Sheets

ACTION TABLE

| ID | AVATARS' ACTION (SCRIPT) | MEANING | RECOMMENDATION METHOD (SCRIPT) | PARAMETER |
|---|---|---|---|---|
| 1 | turn $\theta z$ [deg] to ($\theta z-90\pm\sigma$) [deg] | TURN LEFT | Msg("TURN LEFT!") | $\theta z$ : FACING DIRECTION OF AVATAR<br>$\sigma$ : PREDETERMINED ALLOWABLE ERROR RANGE |
| 2 | arrive at (x, y) | ARRIVE AT A SPOT | Disp(DOWNARROW, (x,y))<br>Msg("YOU'RE HERE") | (x, y): POSITION OF A SPOT |
| 3 | click object $\alpha$ | PRESS BUTTON | Disp("Click me", getPosition($\alpha$))<br>Msg("YOU'RE HERE") | $\alpha$: ANY ONE OF BUTTON OBJECTS DETERMINED BY USER |
| 4 | look $\theta x$ [deg] to ($\theta x+90\pm\sigma$) [deg] | LOOK UP | Msg("LOOK UP!") | $\theta x$ : NECK ANGLE OF AVATAR<br>$\sigma$ : PREDETERMINED ALLOWABLE ERROR RANGE |
| | ... | ... | ... | ... |

FIG. 5

(a)
FIRST TO n-TH
FREQUENT ACTION S
UBSEQUENCE SETS
(* MINIMUM LENGTH IS SET TO 3)

(b)
EXTRACTED ACTION MODELS
(* MINIMUM LENGTH IS SET TO 3,
AND SUPPORT LEVEL IS SET TO
NOT LOWER THAN 0.25)

| FREQUENT ACTION SEQUENCE | SUPPORT LEVEL |
|---|---|
| 4-2-3 | 0.8 |
| 2-3-3 | 0.5 |
| 2-3-3-4 | 0.5 |
| 4-2-3-1 | 0.3 |
| ... | ... |

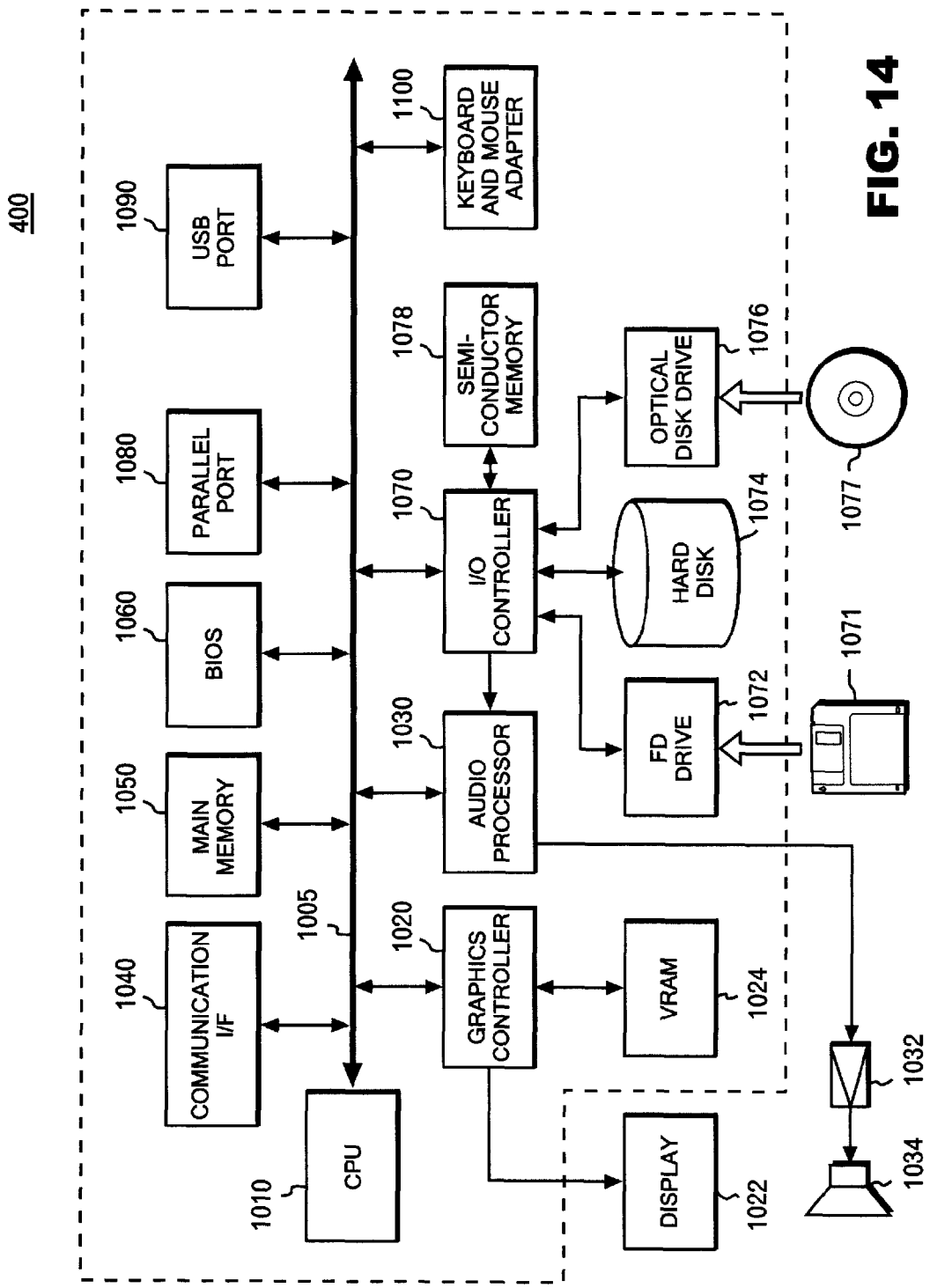

OPERATIONAL ASSISTANCE SERVER DEVICE, OPERATIONAL ASSISTANCE METHOD AND COMPUTER PROGRAM

CROSS-REFERENCE TO RELATED APPLICATION

This application claims priority under 35 U.S.C. §119 from Japanese Patent Application No. 2008-48343 filed Feb. 28, 2008, the entire contents of which are incorporated herein by reference.

BACKGROUND OF THE INVENTION

1. Field of the Invention

The present invention relates to an operational assistance server device, an operational assistance method and a computer readable article of manufacture, for assisting a user who operates an application to perform an appropriate operation.

2. Description of Related Art

Conventional games are generally based on fixed scenarios. In contrast, virtual world games allow a user to freely control a character referred to as an avatar. Thus, an avatar can personify the user, go shopping, or communicate with other avatars.

More and more companies have started their activities in such virtual worlds. Many of such companies that have entered the virtual worlds aim to utilize the virtual worlds for promotions to improve their product and service sales, enhance their bland images, or carry out other types of promotions. Such companies even aim to utilize the virtual worlds for advertising, commerce, customer service provisioning, and collaborations. Companies that have entered the virtual worlds provide various services on their sites that are located in the virtual worlds. Such services include selling their products at virtual stores and holding events such as a quiz contest.

An increasing number of the companies having entered virtual worlds intend to enhance their brand image by allowing avatars to enjoy themselves relatively freely in their sites instead of having any clear goal such as getting avatars to purchase their products. However, some avatars visiting this kind of site for the first time do not know how to act on these sites to enjoy themselves, so that it is beneficial for the avatars to be informed of actions taken by many avatars having visited the site before.

Japanese Patent Application Publication No. 2005-056022 describes a method for extracting actions taken by many avatars having visited a site before, for example. In the method described in Japanese Patent Application Publication No. 2005-056022, actions of a large number of avatars are recorded and characteristic action patterns shared by many of the avatars are extracted. Specifically, with the method described in Japanese Patent Application Publication No. 2005-056022, action patterns shared by many of the moving objects are easily extracted from action histories of a large number of moving objects. Each action pattern includes spots which the moving objects visit, a visit order, and stay times in the respective spots.

Although the method described in Japanese Patent Application Publication No. 2005-056022 is a method of storing information on actions of many avatars and extracting characteristic action patterns from the stored information, the method only handles actions of "visiting." However, avatars take various actions other than "visiting," so that applying the method described in Japanese Patent Application Publication No. 2005-056022 to virtual worlds has a problem that actions of avatars other than "visiting" cannot be retrieved. Japanese Patent Application Publication No. 2005-056022 neither describes a method of presenting the extracted action patterns to avatars, nor addresses a problem that a user can have a negative impression on software if the user feels at a loss as to how to operate the software as in the case of how to act in a virtual world.

SUMMARY OF THE INVENTION

In view of the problems described above, there is a need to enable a user to operate an application by extracting the most appropriate operation from various operations of other users and thus, presenting the most appropriate operation to the user. Thus, the present invention provides such assistance by presenting the most appropriate operation to the user.

According to an aspect of the present invention, an operational assistance server device for providing operational assistance to a user operating an application is provided. The operational assistance server device includes: an operation table which includes previously defined (i) at least one operation on the application and (ii) at least one operation ID identifying at least one respective operation; an operation table storage unit for storing the operation table; at least one user's operation history which includes at least one operation by the user; at least one operation sequence which includes some of the operation IDs, generated by converting the operation history into corresponding operation IDs with reference to the operation table; an operation sequence generation unit for generating the operation sequence; an operation record storage unit for storing the operation sequence generated by the operation sequence generation unit; operation subsequences constituting the operation sequences stored in the operation record storage unit; an appearing-operation-sequence extraction unit for extracting appearing operation sequences from the operation subsequences; and an appearing-operation-sequence storage unit for storing the appearing operation sequences extracted by the appearing-operation-sequence extraction unit; where the appearing operation sequence appears at a frequency higher than a predetermined value.

According to another aspect of the present invention, an operational assistance method of providing operational assistance to a user operating an application is provided. The operational assistance method includes the steps of: generating the operation sequence from the operation history of the user by converting the user's operations into corresponding operation IDs based on an operation table; storing the generated operation sequences as operation records; extracting the appearing operation sequences from the operation subsequences where each of the appearing operation sequences appear at a frequency higher than a predetermined value; and storing the extracted appearing operation sequences; where (i) the operation table includes previously defined operations on the application and previously defined operation IDs identifying the respective operations, (ii) the operation sequence includes some of the operation IDs, (iii) the operation history includes the operations by the user, (iv) the operation subsequences includes the operation sequences stored as the operation records.

According to another aspect of the present invention, a computer readable article of manufacture tangibly embodying computer readable instructions for executing the above method of providing operational assistance to a user operating an application is provided.

BRIEF DESCRIPTION OF THE DRAWINGS

FIG. 5 shows a data configuration stored in an action table DB;

FIG. 14 shows an information processor as a typical example of a hardware configuration of the operational assistance server device 100.

DETAILED DESCRIPTION OF THE PREFERRED EMBODIMENT

Figure 1:
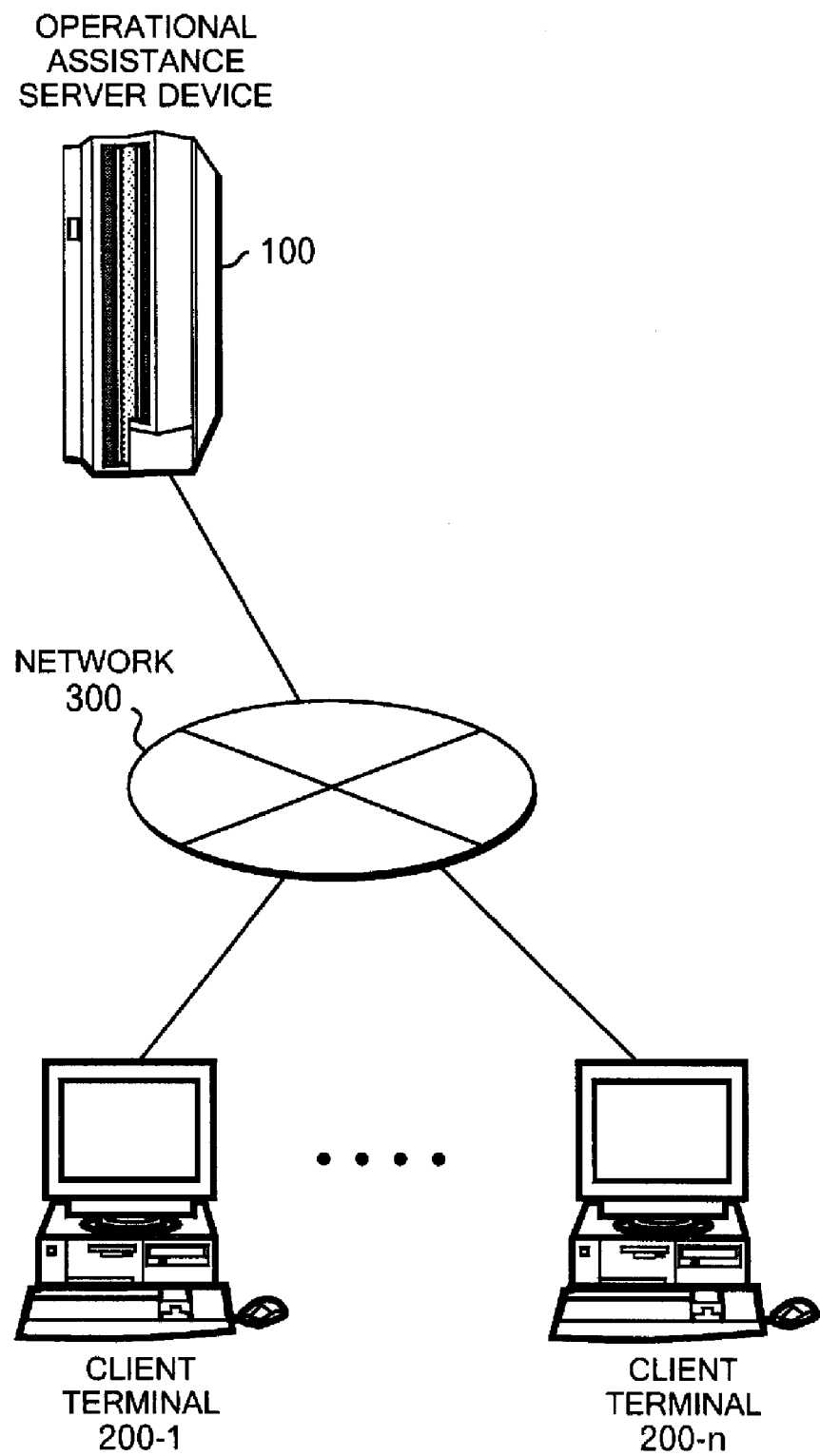
FIG. 1 shows an implementation of an operational assistance server device according to an embodiment.

For a more complete understanding of the present invention and the advantages thereof, reference is now made to the following descriptions taken in conjunction with the accompanying drawings.

"Application" is defined herein to mean either (i) software installed on a computer, such as word-processing software and numerical computation software or (ii) a virtual world with a server-client configuration which is simultaneously shared by a large number of client terminals.

According to an embodiment of the present invention, the operational assistance server device generates appearing operation sequences on an application by using both operation histories of users in the application and an operation table in which operations on the application are defined.

The operational assistance server device is capable of sequencing the user's operation histories by converting the operation histories into the corresponding operation IDs with reference to the operation table in which the operation IDs are further defined.

According to another embodiment of the present invention, the operational assistance server device can further include an operational-assistance-means output unit. The operational-assistance-means output unit extracts the appearing operation sequence having first several operation IDs that match an operation sequence generated from the user's operation history by the operation sequence generation unit when the user performs operations. Then, the operational-assistance-means output unit outputs operational assistance means, as an operation recommended to the user, with reference to both the operation table storage unit and the operation ID immediately after the first several operation IDs in the extracted appearing operation sequence.

The operation table storage unit further stores the operational assistance means which correspond to the respective operation IDs and are to be presented to users, and the first several operation IDs which match the operation sequence generated by the operation sequence generation unit. According to this embodiment of the present invention, the operational assistance server device recommends, to a user, an operation of an application that needs doing next, on the basis of appearing operation sequences generated from operation histories of other users. This prevents the user from feeling at a loss as to how to operate the application next, and thus from having a negative impression of the application.

According to yet another embodiment of the present invention, the operational assistance server device can further include an evaluation obtaining unit for obtaining an evaluation value at which the user rates the application. The operation sequence generation unit can determine from which operation history the operation sequence generation unit should generate the operation sequence, based on the evaluation values obtained by the evaluation obtaining unit. The operation record storage unit stores the operation records of a predetermined evaluation value. This makes the operation record storage unit free from the need of storing an enormous amount of data, that is, all the operation records. The predetermined evaluation value is any satisfaction level or the like on the application. By generating the appearing operation sequences from operation records with a predetermined evaluation value, the operational assistance server device can sort the appearing operation sequences according to evaluation values. Specifically, the operational assistance server device can sort them into appearing operation sequences expected to have good evaluations, and those expected to have poor evaluations, for example.

Referring to FIG. 1, an implementation of an operational assistance server device 100 is shown according to an embodiment of the present invention. As shown in FIG. 1, the operational assistance server device 100 is connected to user's client terminals 200-1, 200-2, . . . , 200-n through a communication network typified by the Internet or an intranet, such as a network 300 (hereinafter, the client terminals 200-1, 200-2, . . . , 200-n will be described simply as client terminals 200, when the client terminals 200-1, 200-2, . . . , 200-n need not be distinguished). Through these connections, the operational assistance server device 100 can exchange data with the client terminals 200. Each client terminal 200 needs only to be a device capable of exchanging data with the server device 100 through the network 300 or directly, such as a personal computer. Note that the number of the operational assistance server devices included in the configuration of this embodiment is not limited to one, but can be two or more.

Figure 2:
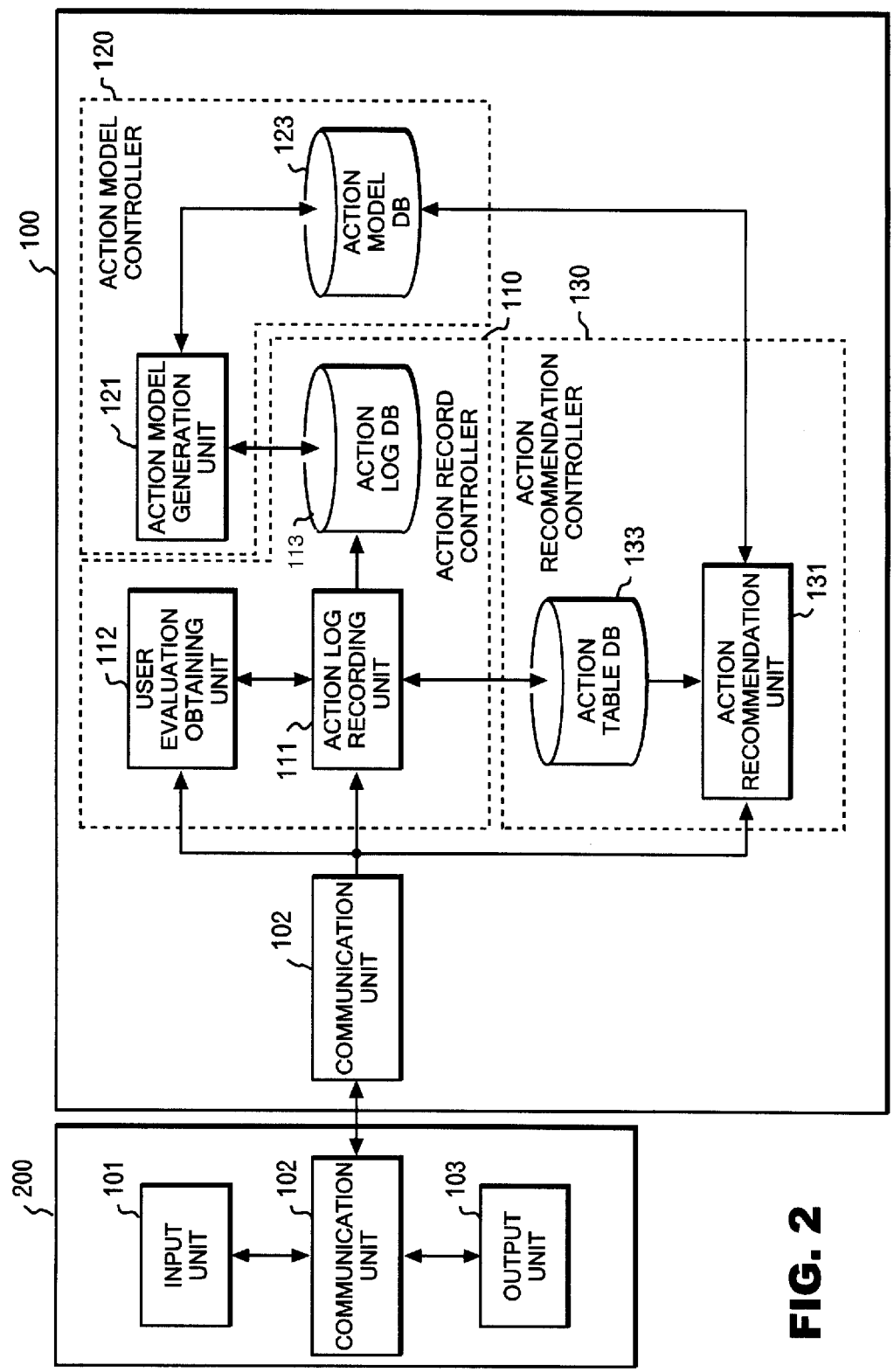
FIG. 2 shows a configuration of the operational assistance server device and a configuration of each client terminal in the embodiment in which the present invention is applied to a virtual world.

Another embodiment of the present invention applies to a virtual world. An operation performed by a user is described as an avatar's action. FIG. 2 shows a configuration of the operational assistance server device 100 and a configuration of each client terminal 200 in an embodiment of the present invention applied to a virtual world. The operational assistance server device 100 includes a communication unit 102, an action record controller 110, an action model controller 120 and an action recommendation controller 130. As the action record controller 110, the operational assistance server device 100 includes an action log recording unit 111, a user evaluation obtaining unit 112 and an action log database 113 (hereinafter, database will be abbreviated to as DB for simplicity). As the action model controller 120, the operational assistance server device 100 includes an action model generation unit 121 and an action model DB 123. As the action recommendation controller 130, the operational assistance server device 100 includes an action recommendation unit 131 and an action table DB 133. Each client terminal 200 includes a communication unit 102, an input unit 101 and an output unit 103. The communication unit 102 transmits and receives data to/from the operational assistance server device 100. The input unit 101 receives avatar's actions or the like inputted by the user of the client terminal 200. The output unit 103 outputs images of the virtual world and voices of avatars.

According to another embodiment of the present invention, the functional units of the operational assistance server device 100 will now be described. The user evaluation obtaining unit 112 obtains an evaluation value of each site determined by an avatar who visits the site. The action log recording unit 111 selects avatars' action logs according to the evaluation values obtained by the user evaluation obtaining unit 112. The action log DB 113 stores the avatars' action logs selected by the action log recording unit 111. The action model generation unit 121 extracts frequent action sequences (appearing operation sequences) as action models, each of which appears at a predetermined frequency, from the action logs stored in the action log DB 113. The action model DB 123 stores the action models extracted by the action model generation unit 121. The action recommendation unit 131 obtains an action to be recommended, from the action model DB 123 on the basis of an avatar's action. The action table DB 133 includes definitions of important avatars' actions on a site basis, that is, mainly includes avatars' actions, IDs and methods for recommending actions.

The action log recording unit 111 is an example of an operation sequence generation unit; the user evaluation obtaining unit 112 is an example of an evaluation obtaining unit; the action log DB 113 is an example of an operation record storage unit; the action model generation unit 121 is an example of an appearing-operation-sequence extraction unit; the action model DB 123 is an example of an appearing-operation-sequence storage unit; the action recommendation unit 131 is an example of an operational-assistance-means output unit; and the action table DB 133 is an example of an operation table storage unit. Note that each storage unit is not limited to a DB on a hard disk. Alternatively, each storage unit can be an external storage device such as a memory, a magnetic tape or a flexible disk. A hardware configuration of the operational assistance server device 100 will be described later.

Figure 3:
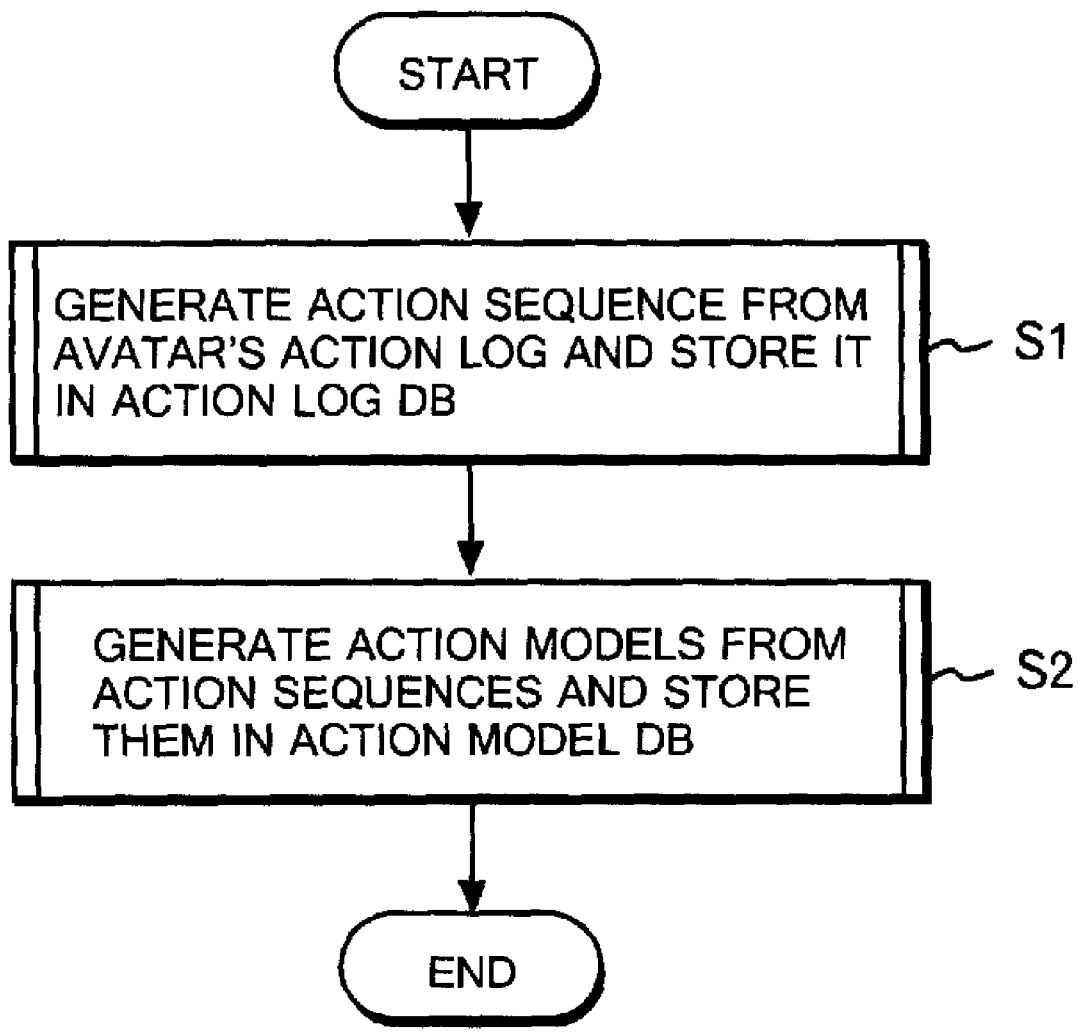
FIG. 3 is a flowchart of an action model generation process.

According to still another embodiment of the present invention, an avatars'-action-model generation process performed by the operational assistance server device 100 will now be described. FIG. 3 is a flowchart of the action model generation process. In step S1, the action record controller 110 generates an action sequence from an avatar's action log (operation history) and stores the action sequence in the action log DB 113.

Figure 4:
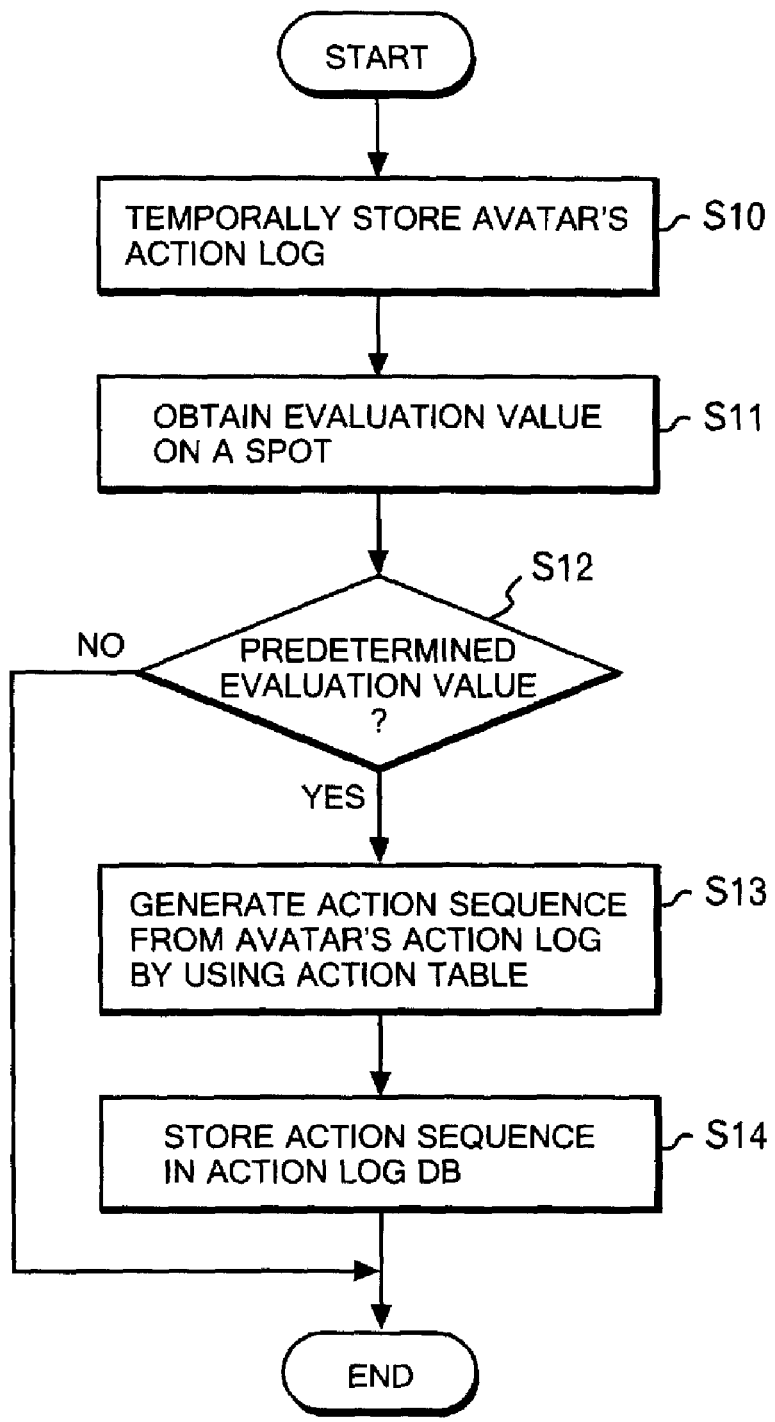
FIG. 4 is a flowchart of an action log recording process.

The action log recording process in step S1 is described in detail with reference to FIG. 4. FIG. 4 is a flowchart of the action log recording process. The action record controller 110 starts processing when the avatar having reached a certain spot (hereinafter, referred to as an A spot) starts action. The A spot represents a site itself in the virtual world, or a spot in a site in the virtual world. For example, the A spot represents a spot in front of a fountain in a site. When the action record controller 110 starts processing, the action log recording unit 111 temporally stores therein the avatar's action log (step S10). A site administrator can set, to any time, storage completion time of an action log on the site. For example, it can be time at which the avatar leaves the site, or time after a predetermined time has passed since the avatar took the last action.

Next, at the storage completion time of the action log, the user evaluation obtaining unit 112 obtains an evaluation value on the A spot (step S11). The site administrator can set the type of evaluation value and an obtaining method of the evaluation value as he/she likes. The evaluation value can be a value representing a satisfaction or an impression of a site on a multi-point scale such as a three-point scale, a five-point scale or the like. In the following description, as the evaluation value on each site, a three-point scale of "satisfactory," "neutral" or "unsatisfactory" is used.

The obtaining method of the evaluation value can be either receiving an evaluation value on a site inputted by a user of an avatar to a pop-up window displayed for receiving the evaluation, or automatically calculating an evaluation value on a site from the time that an avatar spent on the site. In the case of the method in which such an evaluation value is inputted by a user, if a user does not input any evaluation, the evaluation value on the site can be determined as "unsatisfactory," or the evaluation value on the site can be regarded as not being obtained so that the processing is terminated. On the other hand, in the case where a site is automatically evaluated on the basis of time that an avatar spent on the site, reference values of spent time for determining the evaluation values need to be set.

In step S12, the action log recording unit 111 determines whether or not the evaluation value on the A spot obtained in step S11 is a predetermined evaluation value. The predetermined evaluation value, which is set by the site administrator, is any one of "satisfactory," "neutral" and "satisfactory". If the evaluation value on the A spot is "satisfactory," an action model that satisfies the user (hereinafter, referred to as a successful model) is stored in the action model DB 123. On the other hand, if the evaluation value on the A spot is "unsatisfactory," an action model that does not satisfy the user (hereinafter, referred to as unsuccessful model) is stored in the action model DB 123. In step S13, by using the action table DB 133, the action log recording unit 111 sequences actions in the action log in the A spot having a predetermined evaluation value to generate an action sequence.

FIG. 5 shows a data configuration stored in the action table DB 133. The action table includes an ID region, an avatars' action region, a meaning region, a recommendation method region and a parameter region. The ID region stores IDs identifying the respective avatars' actions, and the avatars' action region stores scripts that describe the respective avatars' actions in a system language. The meaning region stores the meanings of the respective scripts stored in the avatars' action region. The meanings are described in a language that the site administrator can understand. The recommendation method region stores processing scripts that a computer performs in order to recommend actions to avatars. The parameter region stores definitions of respective parameters used in the scripts stored in the avatars' action region and the recommendation method region.

In the action table, according to predefinitions made by the site administrator, the scripts that describe the respective avatars' actions in a system language can be associated with their meanings, and the parameters for the scripts can be set. Thus, this action table makes it possible for the site administrator to previously define which avatars' actions are important in the site. Note that such an action table must be prepared for each site. This is because important actions differ from one site to another. For example, for a site in which a monument stands at a spot (x, y), an event that an avatar arrives around the spot (x, y) is meaningful enough to be paid attention to, but such an event is meaningless for the other sites.

Figure 6:
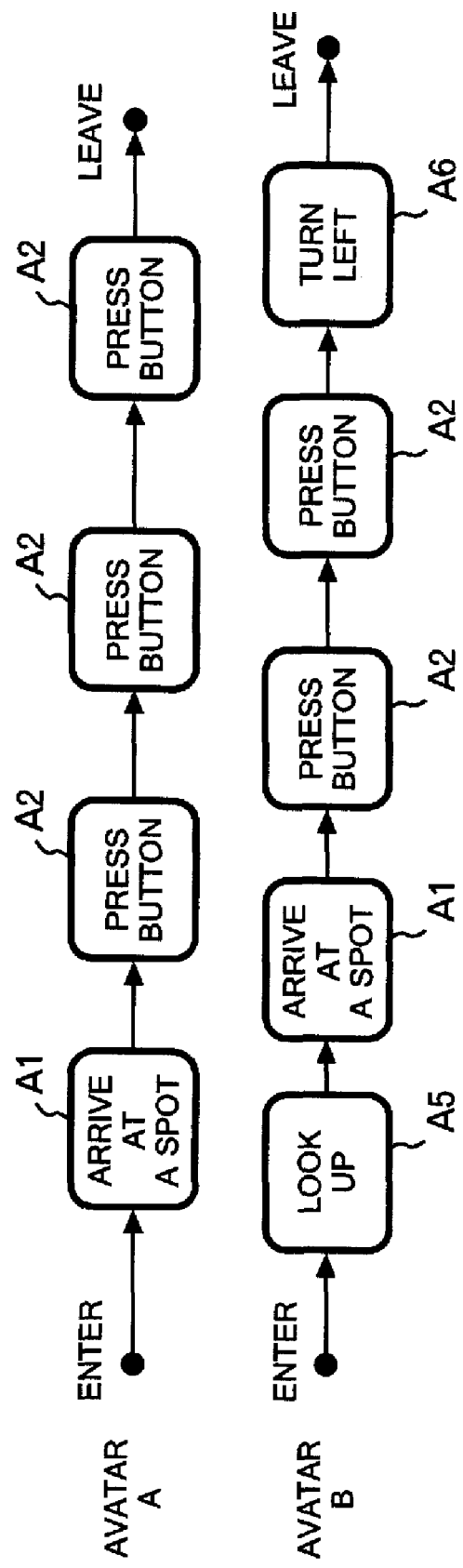
FIG. 6 shows action logs of avatars A and B in a certain site.

According to a further embodiment of the present invention, a description is given of a method of generating an action sequence by sequencing actions in an action log in the A spot having a predetermined evaluation value as shown in step S13 in FIG. 4. FIG. 6 shows action logs of avatars A and B in a certain site. After entering the certain site, the avatar A starts moving and arrives at the A spot on the site (A1). Thereafter, the avatar A repeats an action of pressing a button (A2) three times, and then leaves the site. After entering the site, the avatar B firstly looks up (A5), then starts moving and arrives at the A spot on the site (A1). The avatar B repeats an action of pressing the button (A2) twice, turns left (A6), and leaves the site. The action log recording unit 111 sequences the action log of each of the avatars A and B to generate an action sequence, by using the action table shown in FIG. 5. Specifically, the action log recording unit 111 sequences the actions of each action log by converting them into the IDs defined in the action table, thereby to generate an action sequence. Note that actions not defined in the action table are not included in an action sequence. This is because the actions not defined in the action table are unimportant in the site.

Since the action "arrive at the A spot" (A1) of the avatar A which is shown in FIG. 6 is defined as ID=2 in the action table in FIG. 5, the action is converted into "2." The action "press the button" (A2) is also converted into "3." Accordingly, the action sequence "2-3-3-3" is generated from the action log of the avatar A and the action sequence "4-2-3-3-1" is generated from the action log of the avatar B.

Referring back to FIG. 4, in step S13, the action log recording unit 111 stores the thus-generated action sequences in the action log DB 113 (step S14), and the processing is completed. Referring back to FIG. 3, in step S2, the action model controller 120 generates action models from the action sequences stored in the action log DB 113, and stores the action models in the action model DB 123.

According to a still further embodiment of the present invention, the detailed description of step S2 with reference to FIG. 7 will now be given. The action models can be extracted by using an algorithm for mining frequent sequential patterns, such as generalized sequential patterns (GSP) or the like (refer to R. Srikant and R. Agrawal. Mining sequential patterns: Generalizations and performance improvements. In EDBT'96, pp. 3-17. 1996). The GSP is a technique of sequentially growing frequent subsequences on the basis of an apriority that the occurrence frequency of any sequence is not more than that of each of the subsequences of the sequence. As an example, the action model generation process utilizing the GSP will be described herein.

Figure 7:
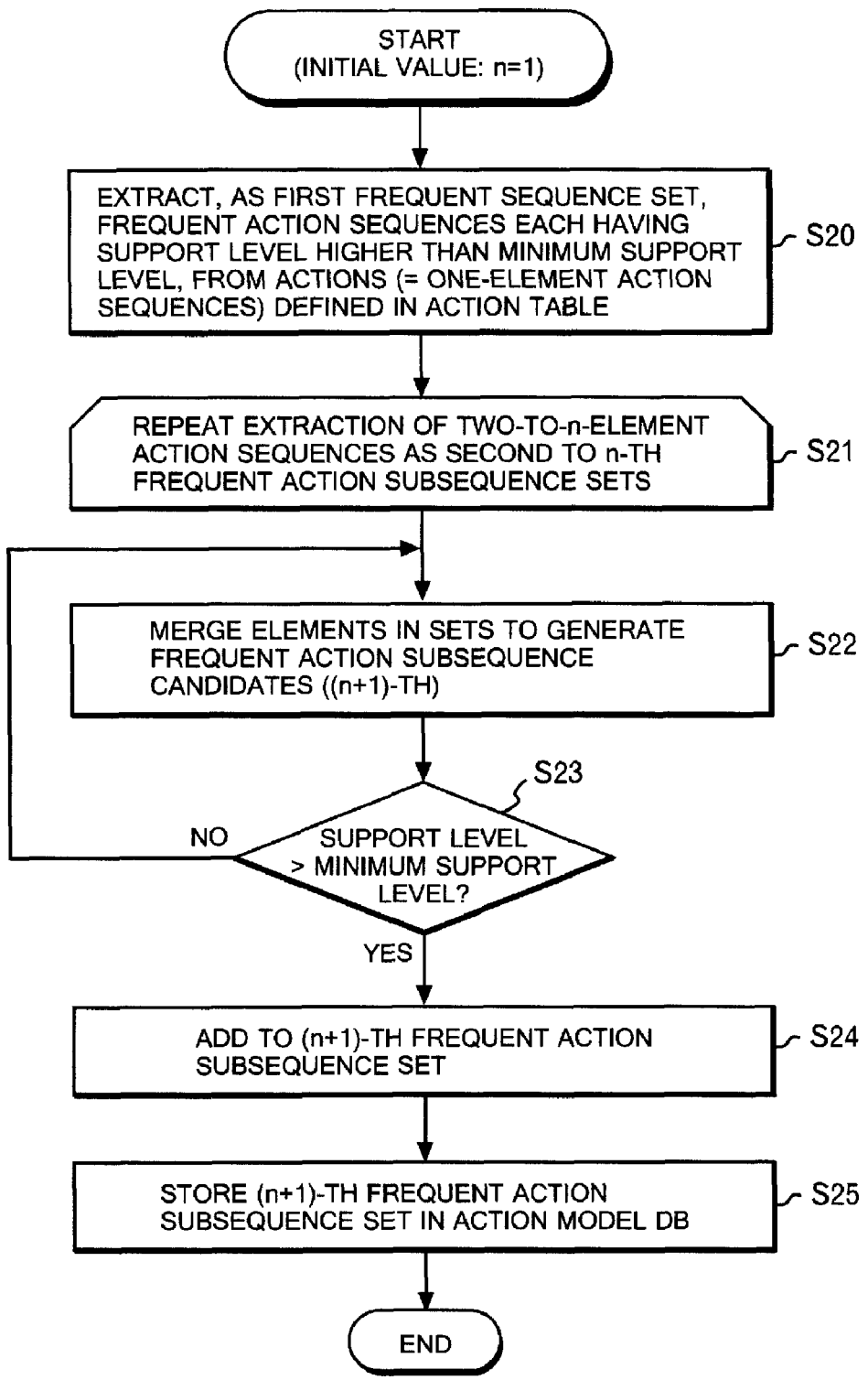
FIG. 7 is a flowchart of the action model generation process utilizing GSP.

FIG. 7 is a flowchart of the action model generation process utilizing the GSP. In step S20, the action model generation unit 121 generates a first frequent sequence set, by extracting one-element frequent action sequences whose support level is higher than a minimum support level. An element is generated from every action defined in the action table, and the one-element frequent action sequence is an action sequence including one action, such as "1" or "2," and as many one-element frequent action sequences as the actions presented in the action table are generated. The support level is obtained from the following formula:

[Formula 1]

$$\text{Support level} = \frac{\text{Number of logs including an action subsequence in the action log } DB}{\text{Total number of logs stored in the action log } DB},$$ Expression (1)

and the minimum support level is set to any value by the site administrator. The closer the support level is to 1, the fewer action models are extracted.

Next, the action model generation unit 121 generates a second frequent sequence set, by extracting two-element frequent action sequences each having a support level higher than the minimum support level. A two-element frequent action sequence is "1-2" or "2-3," for example. When m types of actions are defined in the action table, m×(m−1) two-element frequent action sequences are generated. The action model generation unit 121 repeats the process till generating the n-th frequent action subsequence set (step S21). Here, "n" is the maximum number of elements included in the action sequences which are stored in the action log DB 113. The action model generation unit 121 merges elements in the first to n-th frequent action subsequence sets generated in steps S20 and S21, thus generating (n+1)-th frequent action subsequence candidates (step S22).

Figure 8:
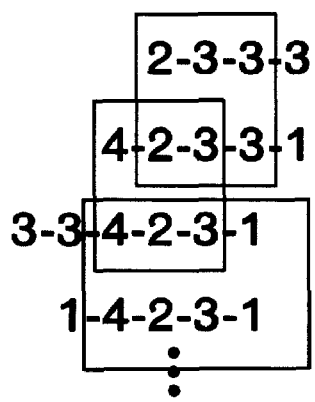
FIGS. 8A and 8B show a merge method employed in step S22 and extracted action models.

FIG. 8A shows a merge method employed in step S22 and FIG. 8B shows extracted action models. FIG. 8A partially shows an example of the first to n-th frequent action subsequence sets, and specific description of step S22 will be given with reference to this example. As shown in FIG. 8A, the action model generation unit 121 merges action subsequences longer than a minimum length and included in two or more action sequences in the first to n-th frequent action subsequence sets, and generates the (n+1)-th frequent action subsequence candidates from the thus-merged action subsequences. The site administrator can set the minimum length to any value. However, too short minimum length leads to the possibility that generated action models can include ones unimportant for the site. On the other hand, minimum lengths which are too long make it difficult to obtain an action model when providing action recommendation to an avatar, which action recommendation will be described later. Thus, the minimum length should preferably be approximately 3.

Referring back to FIG. 7, the action model generation unit 121 calculates the support levels of the respective action subsequences in the (n+1)-th frequent action subsequence candidates generated in step S22, and excludes the action subsequences whose support levels are lower than the minimum support level (step S23). The minimum support level used in step S23 is the same as that used in step S20. In step S23, the action model generation unit 121 set, as (n+1)-th frequent action subsequences, the action subsequences whose support levels exceed the minimum support level. When all the (n+1)-th frequent action subsequence candidates generated in step S22 are processed in step S23 or steps S23 and S24, the action model generation unit 121 stores, in the action model DB 123, as action models, the (n+1)-th frequent action subsequences (hereinafter, referred to as frequent action sequences) generated in step S24 (step S25).

FIG. 8B partially shows action models extracted under conditions where the minimum length is 3 and the minimum support level is 0.25. The action model DB 123, which is configured as shown in FIG. 8B, has an action model region and a support level region. In the action model region, stored are action models, in other words, the frequent action sequences extracted by the action model generation unit 121. The action models "4-2-3" and "4-2-3-1" shown in FIG. 8B are the same in terms of the first three elements, but treated as different action models. This is because what matters here is a sequence of actions, that is, an action log. Similarly, the action models having the same elements in different order, such as "4-2-3" and "2-3-4" are treated as different action models. This is because the order specified by an action sequence also matters herein, and action logs of different action orders have different meanings. In the support level region, stored are the support levels of the respective appearing action sequences obtained using Expression (1). The support levels are used for prioritizing actions and for other purposes in action recommendation for an avatar to be described later.

As has been described, the action models includes successful models generated from avatars' actions of users who rate the site as "satisfactory," unsuccessful models generated from avatars' actions of users who rate the site as "unsatisfactory," and the like. The successful models are mainly used for recommending actions to avatars while the unsuccessful models are used by the site administrator for improving the site or for obtaining new insight from the action models of users. The number of the action model DBs 123 included in the operational assistance server device 100 is not limited to one. The single action model DB 123 can store two tables for the successful models and the unsuccessful models, respectively. Instead, the operational assistance server device 100 can include two separate DBs of a successful model DB and an unsuccessful model.

In these cases, the action log recording process shown in FIG. 4 skips the evaluation value determination process shown in step S12, and an evaluation value is stored together with each action sequence in the action log DB 113. Then, when an action model extracted in the action model generation process in FIG. 7 is stored according to a determination result as to whether the action model is a successful model or an unsuccessful model with reference to the evaluation value stored in the action log DB 113.

According to another embodiment of the present invention, a method of recommending actions to an avatar by using action models stored in the action model DB 123 is provided. The action models are assumed to be successful models.

Figure 9:
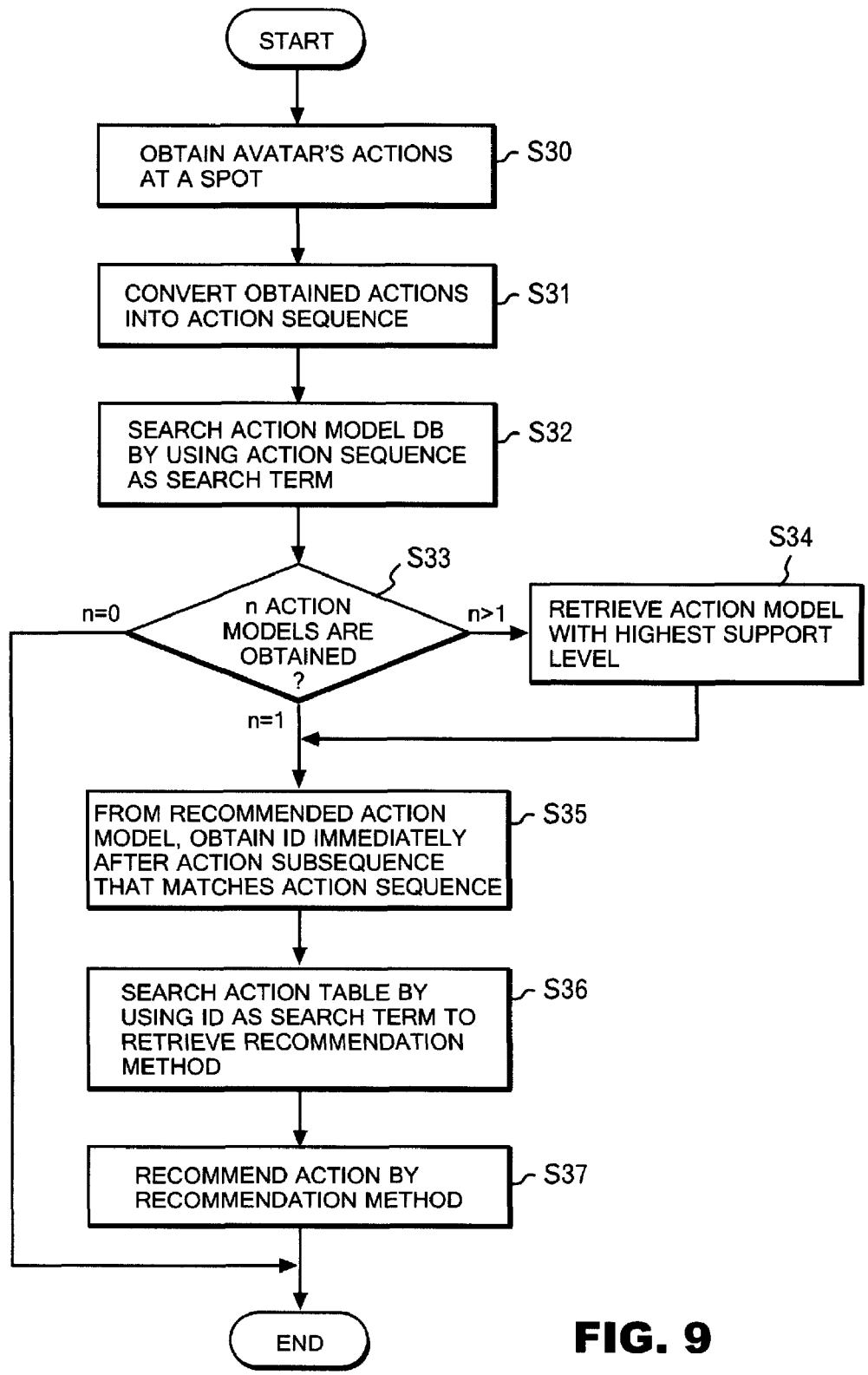
FIG. 9 is a flowchart of an action recommendation process.
Figure 10:
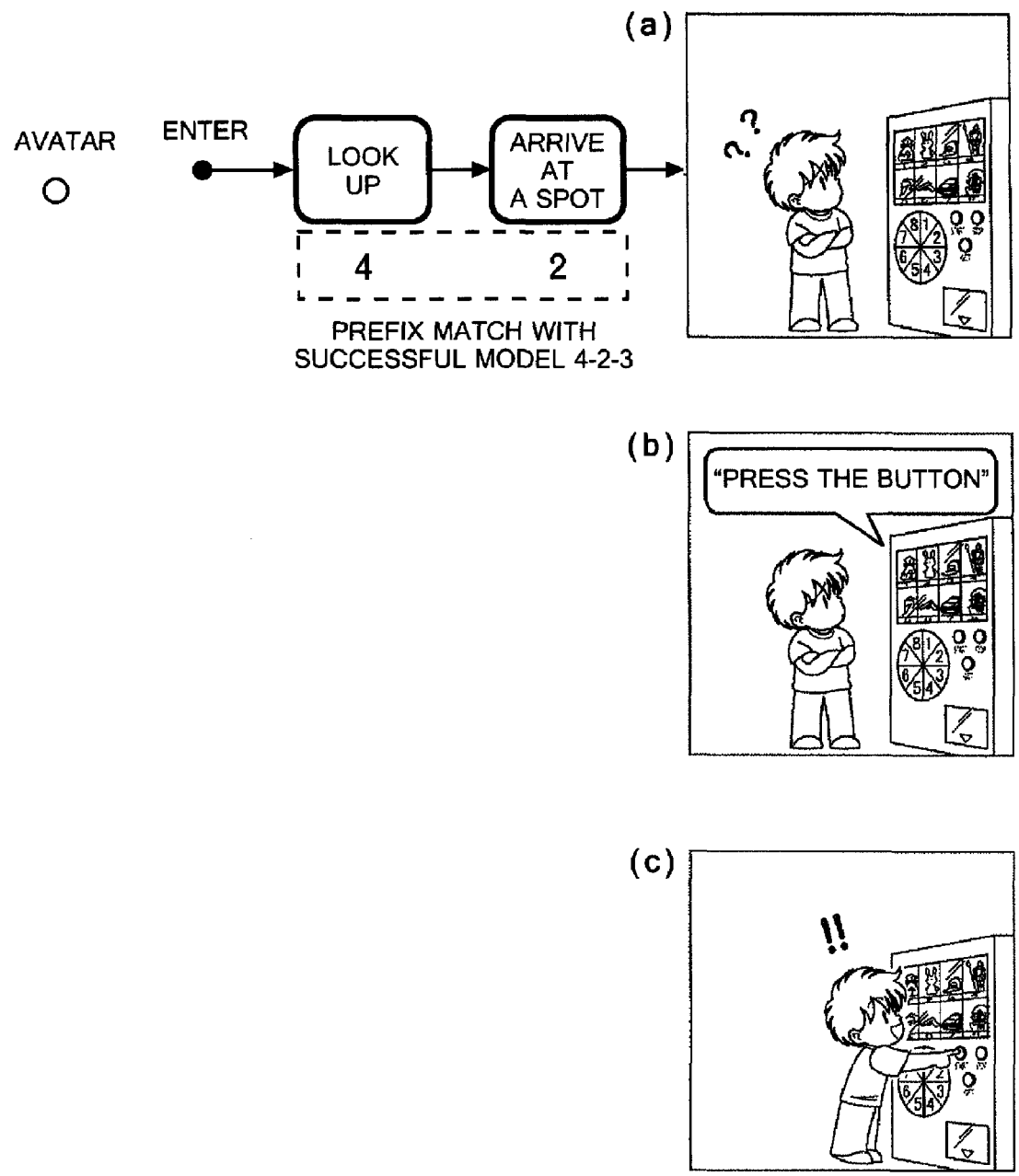
FIGS. 10A to 10C show a specific example in which actions are recommended to an avatar visiting a certain site.

FIG. 9 is a flowchart of an action recommendation process. FIGS. 10A to 10C show a specific example in which actions are recommended to an avatar visiting a certain site. The action recommendation process shown in FIG. 9 will be described using the specific example shown in FIGS. 10A to 10C. Note that the description of FIGS. 10A to 10B is provided based on the action table shown in FIG. 5 and the action model DB 123 shown in FIG. 8B.

In step S30, the action recommendation unit 131 obtains avatar's actions at the A spot. The action recommendation unit 131 can obtain an avatar's action every time the avatar takes action, or can obtain avatar's actions after predetermined time has passed since the avatar took the last action. It is assumed that the action recommendation unit 131 obtains avatar's actions after predetermined time has passed since the avatar took the last action. Note that the site administrator can set the predetermined time to any length.

FIG. 10A shows an avatar that stops taking actions at the A spot. In the example shown in FIGS. 10A to 10C, the avatar visiting a certain site firstly looks up, then starts moving and arrives at the A spot at which a gaming machine is placed, and thereafter, as shown in FIG. 10A, stands still for a predetermined time since the avatar does not know how to operate the gaming machine. In this case, the action recommendation unit 131 obtains the two actions of (1) "look up," and (2) "arrive at the A spot" which the avatar takes before standing still.

Next, the action recommendation unit 131 generates an action sequence by converting the obtained actions into IDs with reference to the action table DB 133 (step S31). In FIG. 10A, the action recommendation unit 131 converts the actions of (1) "look up" and (2) "arrive at the A spot," which are obtained in step S30, into the IDs "4" and "2," respectively, with reference to the action table DB 133, and thus generates the action sequence of "4-2." The action recommendation unit 131 searches the action model DB 123 by using the generated action sequence as a search term (step S32). Specifically, the action recommendation unit 131 performs a prefix search for action models by using the generated action sequence as a search term. This is because, by performing a partial-match search here, the action recommendation unit 131 is more likely to provide an irrelevant recommendation in response to an unfinished action sequence; for each action model only makes sense when it is performed sequentially from the first action, and accordingly an action log starts from the middle of each action model is meaningless.

In step S32, the action recommendation unit 131 counts how many action models are found as a result of searching the action model DB 123 (step S33). If the action recommendation unit 131 finds no action, it completes the processing, and thus recommends no action to the avatar. On the other hand, if multiple action models are found, the action recommendation unit 131 retrieves an action model with the highest support level (step S34). In the example shown in FIGS. 10A to 10C, when searching the action model DB 123 by using "4-2" as a search term, the action recommendation unit 131 finds two action models of "4-2-3" and "4-2-3-1." Since the support level of "4-2-3" is 0.8 while the support level of "4-2-3-1" is 0.3, "4-2-3" is retrieved as a recommended action model. In the case where only one action model matches the search term, the action model is set to be a recommended action model.

Upon retrieving the recommended action model, the action recommendation unit 131 obtains a recommended action by extracting, from the recommended action model, an action immediately after the actions that match the action sequence generated in step S31 (step S35).

In the example shown in FIGS. 10A to 10C, since the action recommendation unit 131 retrieves "4-2-3" by using the action sequence of "4-2" as a search term, it obtains the action of "3" immediately after "4-2" as a recommended action. Each action model includes of IDs of respective actions, so that the recommended action is also obtained in the form of ID. The action recommendation unit 131 searches the action table DB 133 by using the recommended action obtained in step S35 as a search term, and thereby retrieves a recommendation method (step S36). In accordance with the content of the recommendation method, the action recommendation unit 131 recommends the action by using the output unit 103 of the client terminal of the user (step S37). In the example shown in FIGS. 10A to 10C, the action recommendation unit 131 retrieves the method of displaying a message of "press the button" as a method for recommending the action of "3," so that a display of the client terminal 200 of the user displays the message of "press the button."

FIG. 10B shows a screen image in which the avatar is recommended the action. FIG. 1C shows a screen image in which the avatar takes the recommended action. Recommended the action, the avatar can see how to operate the gaming machine, and thus can perform an operation that needs doing next.

As described above, the operational assistance server device according an embodiment of the present invention recommends a user of an avatar, a next action that the avatar should take in a site. Accordingly, this operational assistance server device prevents the user from being at a loss as to which operation to perform next, and thereby prevents the user from having a negative impression on the site. This operational assistance server device allows the user to take actions for fully enjoying himself/herself on the site. Note that if the avatar takes an action of "look up," which is different from the action recommended in FIG. 10B, the action recommendation process is performed again. In this case, three actions of (1) "look up," (2) "arrive at the A spot" and (3) "look up" are obtained in step S30, and processes following the step S31 are performed. However, if the avatar takes another action that is not defined in the action table, the action recommendation process is not performed again but the message of "press the button" is kept displayed as ever.

Examples using a successful model according to additional the embodiments of the present invention are described below:

EXAMPLE 1

As one of the examples, description will be given of a site that allows avatars to tour around the site by car. It is assumed that, for this site, an action table on actions important in the site is previously prepared, and that the action model DB 123 previously stores therein, as successful models, actions taken by other avatars and the like who rate the site as "satisfactory."

Figure 11:
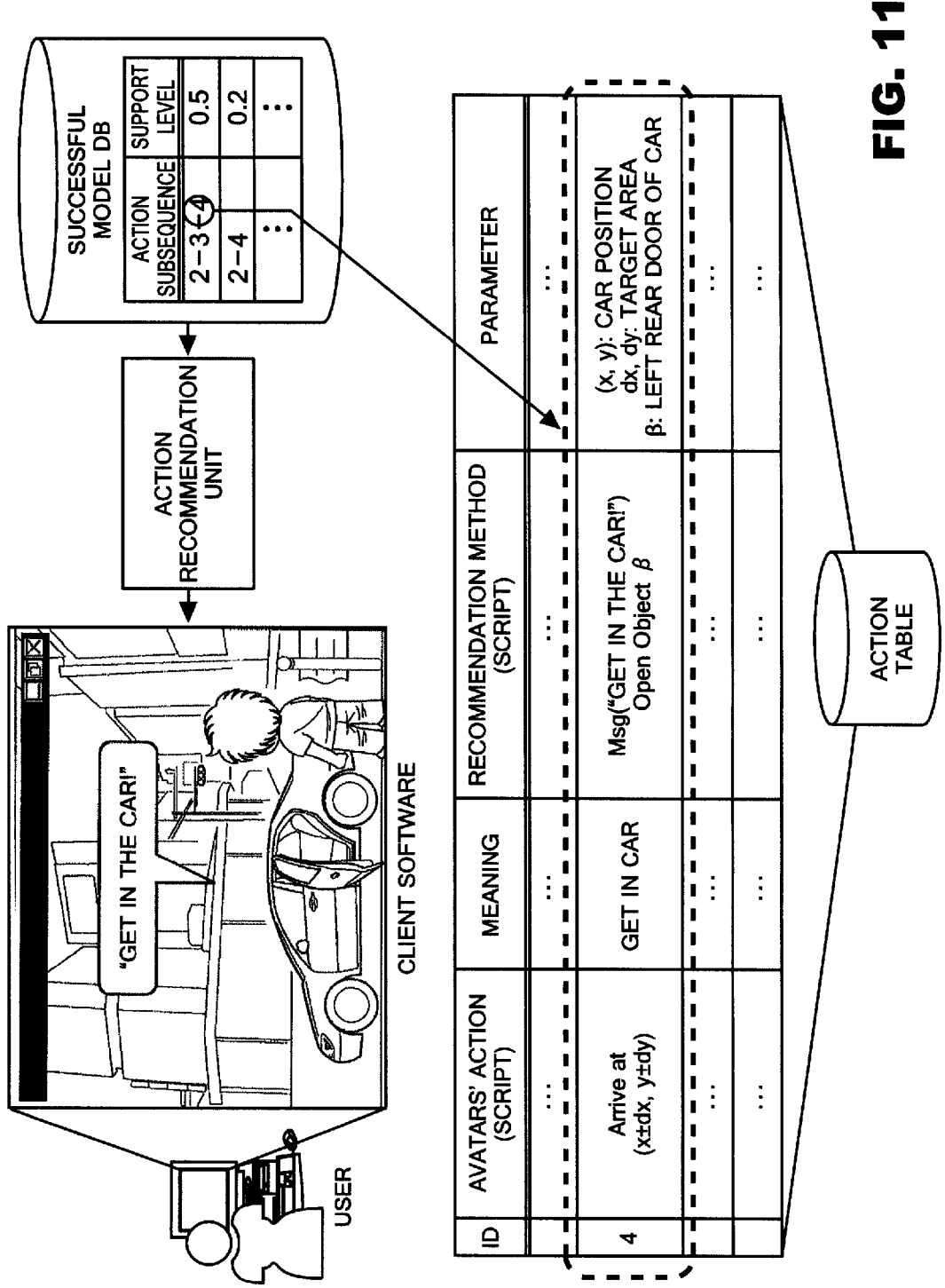
FIG. 11 shows a mechanism of recommending an action to an avatar visiting a site that allows avatars to tour around the site by car.

FIG. 11 shows a mechanism of recommending an action to an avatar visiting the site that allows avatars to tour around the site by car. After entering the site, the avatar buys a ticket at a ticket office (assumed to be ID=2), and arrives at a car station (assumed to be ID=3).

In response, the action recommendation unit 131 searches the action model DB 123 by using this avatar's action sequence "2-3" as a search term, and thus extracts a successful model of "2-3-4." A method for recommending the avatar the action of ID=4 "get in the car" can be retrieved from the recommendation methods in the action table, by using ID=4 as a search term. As the methods for recommending the action of ID=4, two scripts of "Msg("Get in the car!")" and "Open Object β" are set. The former script means to display a message "Get in the car!," and the latter script means to open a left rear door of the car. The action recommendation unit 131 displays these recommendation methods on the display of the client terminal 200 used by the user of the avatar. In this example, two recommendation methods are set. However, the number of recommendation methods is not limited to two, and can be three or more. With such setting, multiple methods can be used to recommend an avatar the action that needs doing next.

EXAMPLE 2

As another one of the examples, description will be given of a site including a forest dotted with world famous tourist spots and allowing avatars to tour around the spots on foot. It is assumed that, in this site, an action table on important actions in the site is previously prepared, and that the action model DB 123 previously stores therein, as successful models, actions taken by other avatars and the like who rate the site as "satisfactory."

Figure 12:
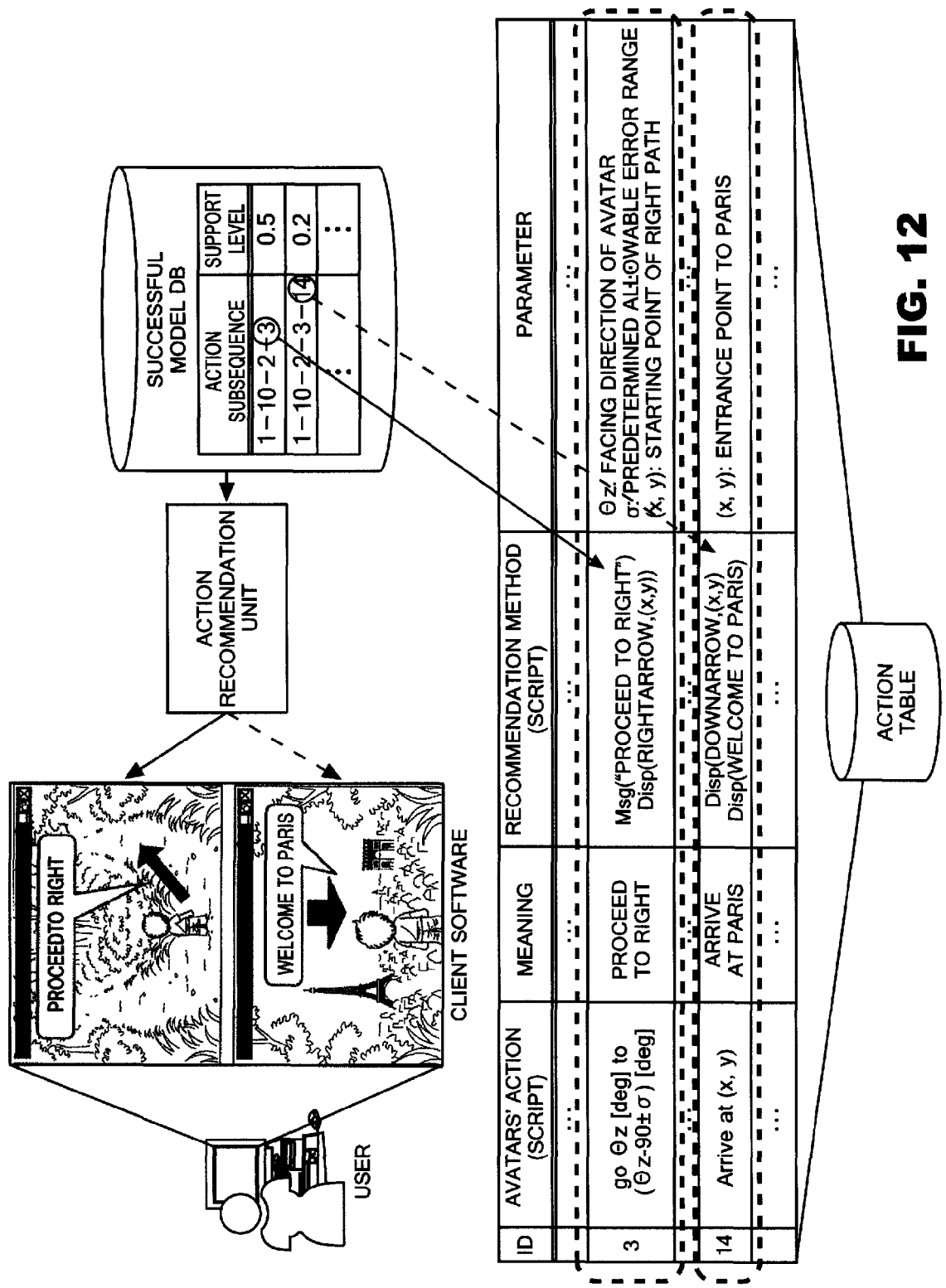
FIG. 12 shows a mechanism of recommending actions to an avatar visiting a site that allows avatars to tour around the famous tourist spots in a forest on the site.

FIG. 12 shows a mechanism of recommending actions to an avatar visiting the site that allows avatars to tour around the tourist spots in the forest. After entering the site, the avatar visits a tourist information center (assumed to be ID=1), tours around Rome (assumed to be ID=10), and thereafter arrives at a fork in the road (assumed to be ID=2).

In response, the action recommendation unit 131 searches the action model DB 123 by using this avatar's action sequence "1-10-2" as a search term, and thus extracts a successful model of "1-10-2-3." A method for recommending the avatar the action of ID=3 "proceed to the right" can be retrieved from the recommendation methods in the action table, by using ID=3 as a search term. As the methods for recommending the action of ID=3, two scripts of "Msg("Proceed to the right")" and "Disp (RIGHTARROW, (x, y))" are set. The former script means to display a message "Proceed to the right," and the latter script means to display, on the road, an arrow to direct the avatar to proceed to the right. The action recommendation unit 131 displays these recommendation methods on the display of the client terminal 200 used by the user of the avatar.

Then, when the avatar proceeds to the right, the action recommendation unit 131 searches the action model DB 123 by using this avatar's action sequence "1-10-2-3" as a search term, this time, and thus extracts a successful model of "1-10-2-3-14." Then, the action recommendation unit 131 searches the action table by using ID=14 as a search term, and thus retrieves two methods for recommending the action of ID=14: one is displaying a message "Welcome to Paris;" and the other, displaying a down arrow. Thereafter, the action recommendation unit 131 displays these recommendation methods on the display of the client terminal 200 used by the user of the avatar. As described above, every time the avatar takes an action, a successful model is reextracted based on the log of the actions taken so far by the avatar. This makes it possible to keep recommending the avatar actions appropriate to the changing avatar's action log.

EXAMPLE 3

Figure 13:
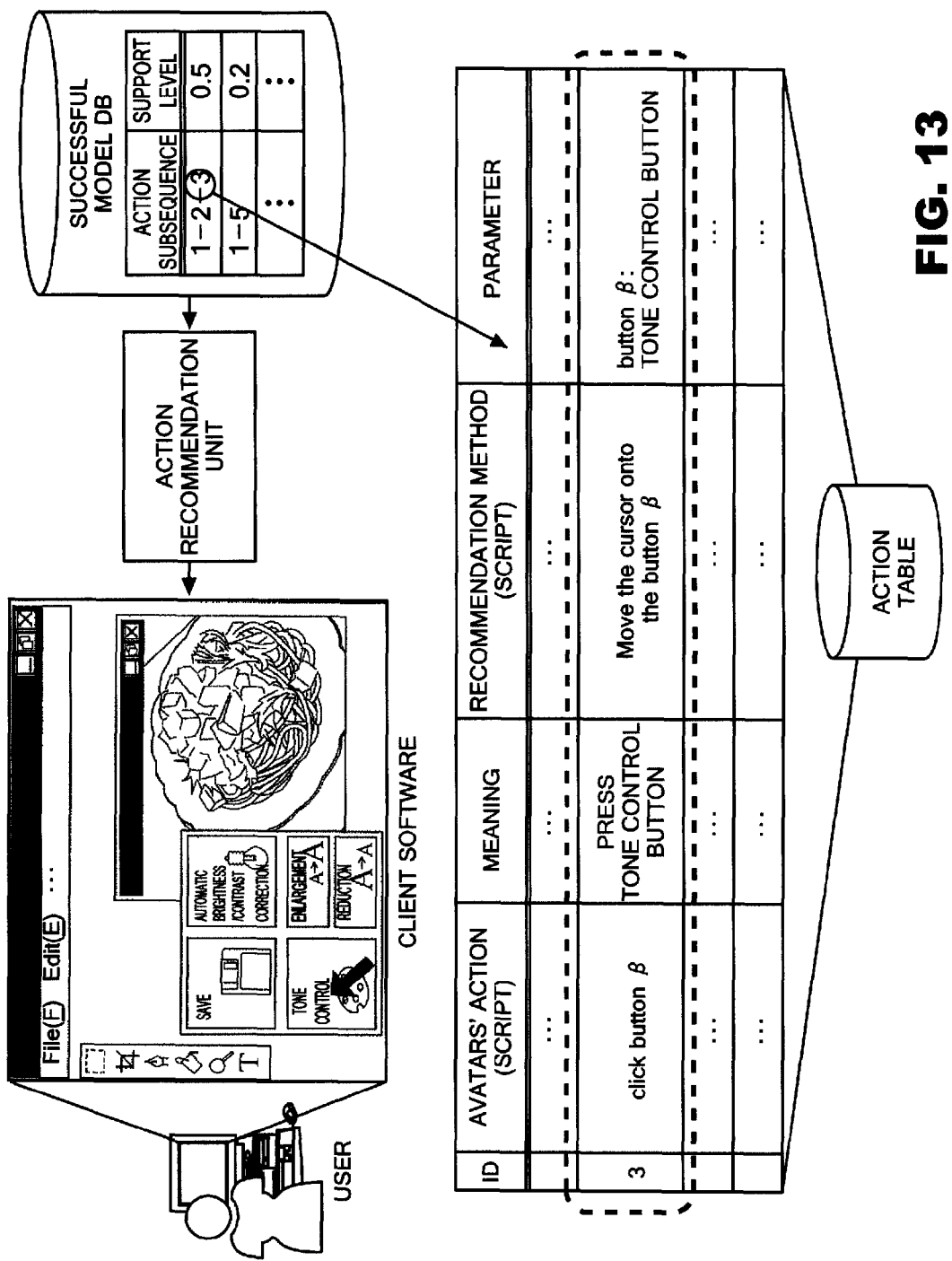
FIG. 13 shows a mechanism of recommending an operation to a user operating software for editing images.

As still another one of the examples, description will be given of software for editing images. It is assumed that, in this software, an operation table on important operations in the software is previously prepared, and that the action model DB 123 previously stores therein, as successful models, operations taken by other users and the like who rate the site as "satisfactory." FIG. 13 shows a mechanism of recommending an operation to a user operating the software for editing images. After starting the software, the user opens a photo image (assumed to be ID=1), and changes the brightness and contrast of the photo image (assumed to be ID=2).

In response, the action recommendation unit 131 searches the action model DB 123 by using this user's operation sequence "1-2" as a search term, and thus extracts a successful model of "1-2-3." A method for recommending the user the operation of ID=3 "change the color tone" can be retrieved from the recommendation methods in the action table, by using ID=3 as a search term. As the methods for recommending the operation of ID=3, a script of "Move the cursor onto the button β" is set. This script means to automatically move the cursor onto a tone control button. The action recommendation unit 131 displays this recommendation method on the display of the client terminal 200 used by the user. As described above, the operational assistance server device according to the present invention is capable of not only recommending an action to a user of an avatar in a virtual world, but also recommending an operation of software installed in a computer to a user of the software.

FIG. 14 shows an information processor 400 as a typical example of a hardware configuration of the operational assistance server device 100 described in the FIG. 2. Hereinafter, description will be given of an example of a hardware configuration of the information processor 400. The information processor 400 includes a central processing unit (CPU) 1010, a bus line 1005, a communication I/F 1040, a main memory 1050, a basic input output system (BIOS) 1060, a parallel port 1080, an USB port 1090, a graphics controller 1020, a VRAM 1024, an audio processor 1030, an I/O controller 1070, and input means such as a keyboard and mouse adapter 1100. To the I/O controller 1070, the storage means including a flexible disk (FD) drive 1072, a hard disk 1074, an optical disk drive 1076 and a semiconductor memory 1078 can be connected.

To the audio processor, an amplification circuit 1032 and a speaker 1034 are connected. A display 1022 is connected to the graphics controller 1020. The BIOS 1060 stores therein a boot program that the CPU 1010 executes at the time of the boot-up of the information processor 400, a program dependent on the hardware of the information processor 400, and other programs. The FD drive 1072 reads a program or data from the flexible disk 1071, to provide it to the main memory 1050 or the hard disk 1074 through the I/O controller 1070.

As the optical disk drive 1076, a DVD-ROM drive, a CD-ROM drive, a DVD-RAM drive and a CD-RAM drive can be employed. Note that an optical disk 1077 supported by the employed drive needs to be used. The optical disk drive 1076 can read a program or data from the optical disk 1077 to provide it to the main memory 1050 or the hard disk 1074 through the I/O controller 1070.

Each computer program to be provided to the information processor 400 is provided by a user in the form of being stored in a recording medium, such as the flexible disk 1071, the optical disk 1077 or a memory card. The provided computer program is read out from the recording medium through the I/O controller 1070, or is downloaded through the communication I/F 1040, and thereby is installed in and executed by the information processor 400. The operations that the computer program causes the information processor 400 to perform are the same as those in the aforementioned device, and accordingly the description thereof will be omitted.

The above computer programs can be stored in an external recording medium. The recording medium used here can be the flexible disk 1071, the optical disk 1077 or a memory card, or can alternatively be a magneto-optical recording medium such as an MD or a tape medium. Furthermore, the recording medium used here can be a storage device, such as a hard disk or an optical disk library, which is provided in a server system connected to a dedicated communication network or the Internet. In this case, the computer program can be provided to the information processor 400 through a communication network.

According to an embodiment of the present invention, the hardware configuration example of the information processor 400 is provided. However, it is possible to implement the functionality similar to that of the aforementioned information processor by installing, onto a computer, a program providing the functionality described as that of the information processor, and thus causing the computer to operate as the information processor. Accordingly, the information processor described as the embodiment of the present invention can alternatively be implemented by a method or a computer program thereof.

The embodiments of the present invention can be implemented as hardware, software, or a combination of hardware and software. A typical example of such implementation as a combination of hardware and software is a computer system including a predetermined program. In such a case, by being loaded and executed on the computer system, the predetermined program causes the computer system to perform processing according to the present invention. The program is composed of a group of instructions which can be written in any language, codes, or notations. Such a group of instructions allows the system to directly execute specific functions, or to execute the specific functions after (1) the instructions are converted into different language, codes or notations, and/or (2) the instructions are copied to a different medium.

The present invention includes not only such a program itself, but also program products, such as a medium storing the program therein. The program for executing the functions of the present invention can be stored in any computer readable medium, such as a flexible disk, an MO, a CD-ROM, a DVD, a hard disk device, a ROM, an MRAM, and a RAM. Specifically, this program can be stored in the computer readable medium by being downloaded to the medium in a computer system from another computer system connected thereto through a communication line, or by being copied from a different medium. The program can either be compressed and stored in a single recording medium or can be divided into smaller units and stored in multiple recording media.

According to another embodiment of the present invention can provide an operational assistance server device that assists a user to operate an application by extracting the most appropriate operation from various operations that users have been performed on the application, and thus presenting the most appropriate operation to the user.

Although the present invention has been described through the use of embodiments, the invention is not limited to these embodiments. The effects described in the embodiment of the present invention are merely a list of the most preferable effects provided by the present invention, and the effects of the present invention are not limited to those described in the embodiment or the examples of the present invention.

What is claimed is:

1. An operational assistance server device for providing operational assistance to a current user operating an application, comprising:
    an action table database for storing an action table wherein said action table comprises (i) at least one previously defined operation on said application and (ii) a unique operation ID corresponding to each of said at least one previously defined operation;
    an action log recording unit for generating an action sequence of avatar actions on site basis,
        wherein said action sequence consists of one or more of said operation ID from an operation history of past users, wherein said operation history of said past users consists of one or more operations by said past users, and
        wherein said generating said action sequence comprises converting said one or more operations into corresponding operation IDs with reference to said action table to form said action sequence having a sequence of numbers with each number representing and operation ID;
    an action log database for storing said at least one action sequence generated by said action log recording unit;
    an action model generation unit for generating an action model from at least one frequent action subsequence candidate, wherein the at least one frequent action subsequence candidate occurs at a frequency higher than a predetermined value;
    an action model database for storing said action model; and
    an action recommendation unit for (i) matching a current user action sequence with a first several operation IDs said action model to determine a recommended action model, and (ii) outputting a recommendation method to said current user action model.

2. The operational assistance server device according to claim 1, wherein a support level is a proportion of (i) a number of logs including an action subsequence in the action log database to (ii) a total number of logs stored in the action log database.

3. The operational assistance server device according to claim 2, wherein
    said support level is stored in association with each action model, and said stored support level is used as an extraction priority in extracting said action model from said action model database.

4. The operational assistance server device according to claim 1, further comprising:
an evaluation obtaining unit for obtaining an evaluation value at which said past user rates said application,
wherein said action log recording unit (i) filters said operation history based on said evaluation value and (ii) generates said at least one action sequence based on said filtered operation history.

5. The operational assistance server device according to claim 1, wherein said user operating said application is a user operating an avatar representing said user in a virtual world.

6. The operational assistance server device of claim 1 wherein
the action model generation unit for generating the action model is performed by (i) repeatedly extracting one or more action subsequence sets having a minimum number of elements, (ii) merging said minimum element action subsequence sets to generate one or more frequent action subsequence candidates, and selecting as one or more action models those frequent action subsequence candidates having a support level which exceeds a minimum support level.

7. An operational assistance method of providing operational assistance to a current user operating an application, comprising the steps of:
generating an action sequence of avatar actions on a site basis from an operation history of past users wherein said operation history includes at least one operation, by converting said past users' at least one operation into corresponding operation IDs based on an action table to form said action sequence having a sequence of numbers with each number representing said operation ID;
storing said generated action sequence in an action log database;
generating an action model from at least one action subsequence said action model having a frequency higher than a predetermined value;
storing the generated action model;
extracting said action model having first several operation IDs that match a current action sequence generated from a current operation history when a current user performs operations;
outputting operational assistance means, as an action recommended to said current user, with reference to (i) said action table and (ii) said operation ID immediately after the first several operation IDs in said extracted action model; and
storing, in said action table, (i) said operational assistance means which correspond to respective said operation ID and are to be presented to said users and (ii) the first several operation IDs matching said current action sequence generated from said current operation history;
wherein (i) said action table comprises previously defined operations on said application and unique previously defined operation IDs corresponding to each of said previously defined operations, (ii) said action sequence consists of one or more of said operation IDs and (iii) said at least one action subsequence constitutes said action sequence stored as said action log database.

8. The operational assistance method according to claim 7, wherein a frequency higher than a predetermined value includes a support level higher than a predetermined value, wherein said support level is a proportion of (i) a number of logs including an action subsequence in the action log database unit to (ii) a total number of stored in the action log database unit.

9. The operational assistance method according to claim 8, wherein
said support level is stored in association with respective said generated action models, and
said stored support level is used as an extraction priority in extracting said generated action models.

10. The operational assistance method according to claim 7, further comprising the steps of:
obtaining an evaluation value at which said user rates said application;
filtering said operation history based on said evaluation value; and
generating said at least one action sequence based on said filtered operation history.

11. The operational assistance method according to claim 10, wherein said at least one action sequence is generated from said operation history having an evaluation value of said application higher than a predetermined value.

12. The operational assistance method according to claim 7, wherein said user operating said application is a user operating an avatar representing said user in a virtual world.

13. The operational assistance method of claim 7, wherein the method provides unsolicited operational assistance to a current user operating an application.

14. A non-transitory computer readable article of manufacture tangibly embodying computer readable instructions which when executed implement a method of providing operational assistance to a current user operating an application, said method comprising the steps of:
generating an action sequence of avatar actions on a site basis from an operation history including at least one operation by converting said at least one operation into a corresponding operation ID based on an action table to form said action sequence having a sequence of numbers with each number representing said operation ID;
storing said generated action sequence;
generating an action model from at least one action subsequence, wherein the action model occurs at a frequency higher than a predetermined value;
storing said generated action model in an action log database;
extracting said at least one action model having first several operation IDs that match a current user's action sequence generated from a current user operation history;
outputting operational assistance means, as an action recommended to said current user, with reference to (i) said action table and (ii) said operation ID immediately after the first several operation IDs in said extracted action model;
storing, in said action table, (i) said operational assistance means which correspond to respective said operation ID and as to be presented to said current user, and (ii) said first several operation IDs matching said current action sequence generated from said current user's operation history;
wherein (i) said action table comprises previously defined operations on said application and unique previously defined operation IDs corresponding to each of said previously defined operations, (ii) said action sequence consists of one or more of said operation IDs, and (iv) said action subsequence constitutes said stored generated action sequence.

15. The non-transitory computer readable article of manufacture according to claim 14,
   wherein a frequency higher than a predetermined value includes a support level higher than a predetermined value,
   wherein said support level is a proportion of (i) a number of logs inculding an action subsequence in the action log database to (ii) a total number of stored in said action log database.

16. The non-transitory computer readable article of manufacture according to claim 15, wherein:
   said support level is stored in association with respective said generated action model; and
   said stored support level is used as an extraction priority in extracting said action model.

17. The non-transitory computer readable article of manufacture according to claim 14, further causing the computer to execute the steps of:
   obtaining an evaluation value at which past users rate said application;
   filtering said operation history based on said evaluation value; and
   generating said action sequence based on said filtered operation history.

* * * * *